United States Patent
Hiebl

(10) Patent No.: US 6,412,223 B1
(45) Date of Patent: Jul. 2, 2002

(54) SINGLE DRIVE SYSTEM FOR A VEHICLE CLOSURE MEMBER

(75) Inventor: Johann Hiebl, Bernhardswald (DE)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/676,733

(22) Filed: Sep. 29, 2000

Related U.S. Application Data

(60) Provisional application No. 60/156,847, filed on Sep. 30, 1999.

(51) Int. Cl.$^7$ ................................................. E05F 15/18
(52) U.S. Cl. ............................ 49/280; 49/352; 49/348
(58) Field of Search .......................... 49/280, 352, 289, 49/348, 349, 350, 351; 74/351

(56) References Cited

U.S. PATENT DOCUMENTS

| | | | | |
|---|---|---|---|---|
| 1,117,763 A | * | 11/1914 | Bates ........................... | 74/344 |
| 3,145,988 A | * | 8/1964 | Colautti et al. ............... | 49/280 |
| 3,154,302 A | * | 10/1964 | Maruyama .................... | 49/280 |
| 3,202,414 A | * | 8/1965 | Simmons et al. ............. | 49/280 |
| 3,713,472 A | * | 1/1973 | Dozois ........................ | 160/189 |
| 4,416,088 A | | 11/1983 | Feucht et al. | |
| 4,478,004 A | * | 10/1984 | Andrei-Alexandru et al. . | 49/72 |
| 4,530,185 A | * | 7/1985 | Moriya et al. ................. | 49/280 |
| 4,617,757 A | * | 10/1986 | Kagiyama et al. ............ | 49/280 |
| 5,228,239 A | * | 7/1993 | Heo ............................. | 49/280 |
| 5,574,315 A | | 11/1996 | Weber | |
| 5,764,010 A | * | 6/1998 | Maue et al. ................. | 318/443 |
| 5,810,423 A | | 9/1998 | Brackmann et al. | |
| 5,829,198 A | * | 11/1998 | Watanabe .................... | 49/280 |
| 5,852,943 A | | 12/1998 | Dutka et al. | |
| 5,906,071 A | | 5/1999 | Buchanan, Jr. | |
| 5,906,123 A | | 5/1999 | Spurr | |
| 5,907,885 A | * | 6/1999 | Tilli et al. ............... | 15/250.16 |
| 5,920,159 A | * | 7/1999 | Miller et al. .................... | 318/4 |

\* cited by examiner

Primary Examiner—Gregory J. Strimbu

(57) ABSTRACT

A drive system includes a selector assembly that selectively operates both a window drive assembly and a lock module drive assembly. The selector assembly preferably includes a slidable shaft attached to first and second inputs. The shaft is mounted to slide in response to an actuator such as solenoid. When the first input is engaged with the output of a drive motor, the motor operates to lock and unlock the lock module drive assembly. When the second input is engaged with the output, the drive motor operates the window drive assembly to drive the window.

12 Claims, 2 Drawing Sheets

SINGLE DRIVE SYSTEM FOR A VEHICLE CLOSURE MEMBER

The present application claims priority to United States Provisional Patent Application Serial No. 60/156,847, filed Sep. 30, 1999.

BACKGROUND OF THE INVENTION

The present invention relates to a drive system for vehicle closure members, and more particularly to a drive system which eliminates duplication of drive motor components located within a vehicle door.

A vehicle door includes a multiple of components such as hinge assemblies, control switches, door latch modules, and window guide assemblies which direct movement of a window pane into and out of the door. Further, the latch module and the window-raising mechanism each require a drive system typically having an electric motor and drive linkage for operation. All of these components are typically contained within a rather small area between an outer and inner panel of the vehicle door. The multiple of components and the operation thereof, may create installation and arrangement difficulties within the door.

Accordingly, it is desirable to reduce the number of components located within the vehicle door to provide cost, weight and space savings.

SUMMARY OF THE INVENTION

The drive system for a vehicle closure according to the present invention includes a selector assembly to selectively operate a multiple of drive assemblies within the vehicle closure member. Preferably, the selector assembly selectively operates both a window drive assembly and a lock module drive assembly.

One embodiment includes a single drive motor having an output which drives a first gear train and a second gear train. The first gear train drives the lock module drive assembly between a locked and an unlocked condition. A second gear train drives the window drive assembly to open and close a window. It should be understood that although a gear train is provided in the disclosed embodiment, other systems for operating a lock module drive assembly and a window drive assembly such as linkages, cables, and electrical systems will benefit from the present invention.

The selector assembly preferably includes a slidable shaft attached to first and second inputs. The shaft is mounted to slide in response to an actuator such as solenoid. When the first input is engaged with the output, a drive motor operates to lock and unlock the lock module drive assembly. When the second input is engaged with the output, the drive motor operates the window drive assembly to drive the window.

The present invention therefore provides a drive system for vehicle closure members that reduces the number of components, such as drive motors to provide cost, weight and space savings.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
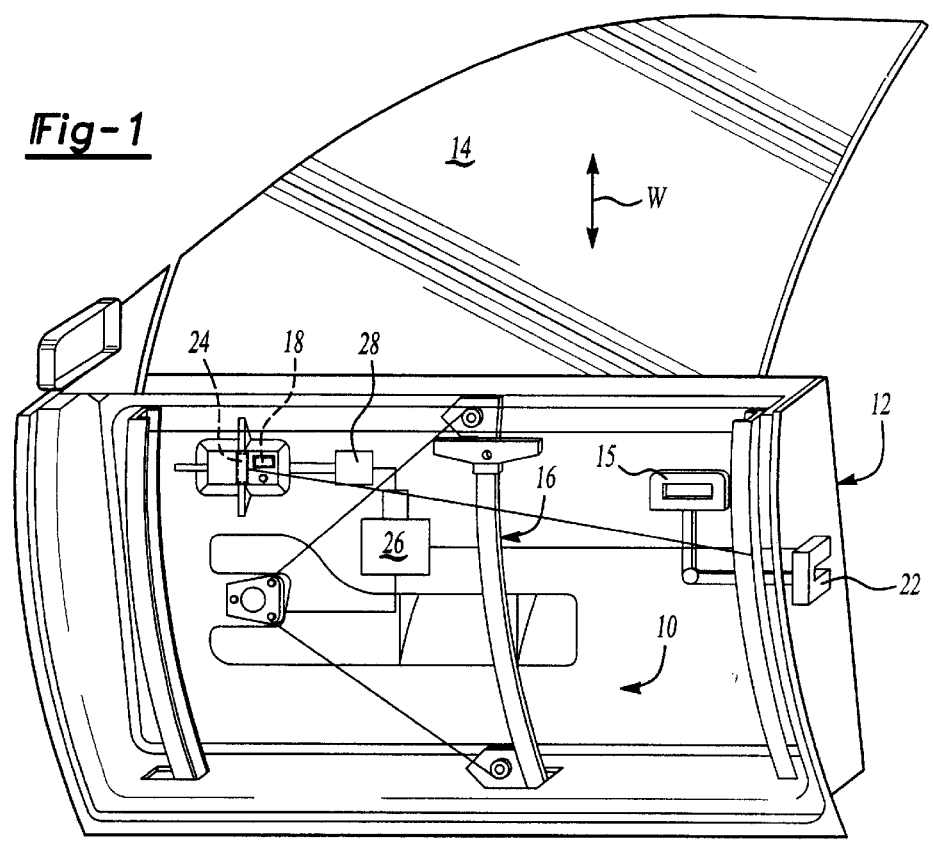
FIG. 1 is a generally schematic side view of a vehicle closure member with an outer door panel removed illustrating a drive system according to the present invention.

FIG. 1 illustrates a drive system 10 for a vehicle closure 12, preferably a vehicle door 12. It should be understood that many vehicle closure members such as doors, lift gates, sliding doors and other vehicle closure members will benefit from the present invention.

The vehicle door 12 includes a window 14 driveable by a window drive assembly 16. As known, the window 14 is selectively movable in the direction of double-headed arrow W in response to a first input 18. The first input 18 is preferably a switch, button or the like which is manipulated by a user to operate the window 14.

The vehicle door 12 also includes a lock module drive assembly 22. The lock module drive assembly 22 is typically connected to a second input 24 such as a switch, button or the like to selectively connect the lock module drive assembly 22 to an outer handle 15 to allow locking and unlocking of the door 12.

Preferably, a selector assembly 26 selectively operates both the window drive assembly 16 and the lock module drive assembly 22. A controller 28 communicates with the first input 18, the second input 24 and the selector assembly 26. The controller 28 selectively connects the selector assembly 26 to either the window drive assembly 16 or the lock module drive assembly 22 in response to actuation of either the first input 18 or the second input 24.

Figure 2A:
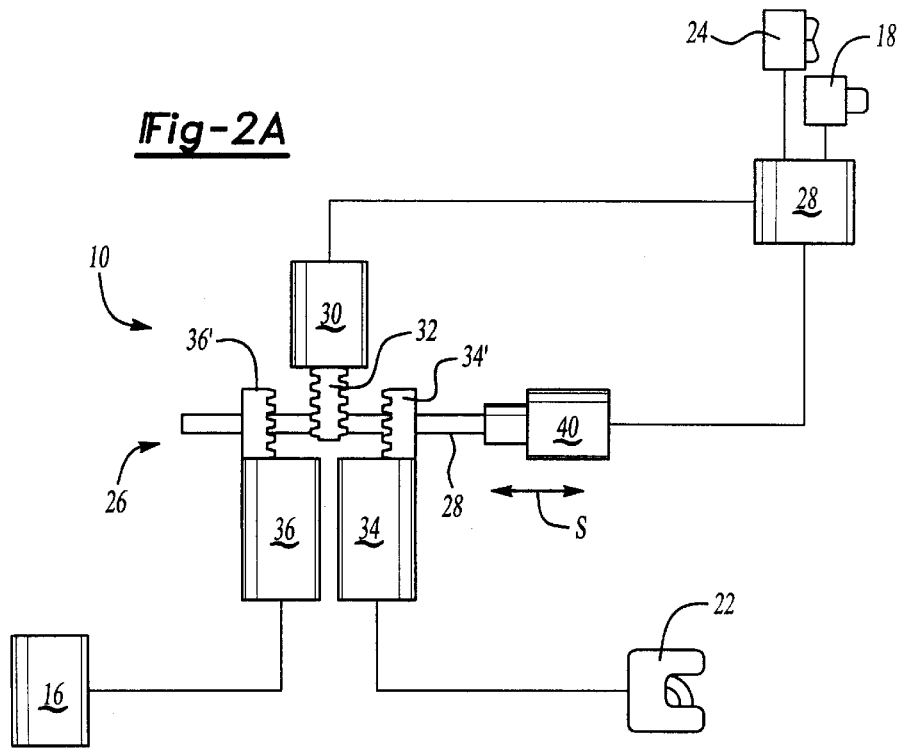
FIG. 2A is a schematic view of the drive system of FIG. 1 in a neutral position.

Referring to FIG. 2A, one embodiment of the selector assembly 26 is illustrated. A drive motor 30 having an output 32 such as a worm gear preferably drives the system 10. A first gear train 34 drives the lock module drive assembly 22 between a locked and an unlocked condition. A second gear train 36 drives the window drive assembly 16 to drive the window 14 in the direction of arrow W (FIG. 1). It should be understood that although a gear train is provided in the disclosed embodiment, other systems for operating a lock module drive assembly and a window drive assembly such as linkages, cables, and electrical systems will benefit from the present invention.

The first gear train 34 includes a first input 34' and the second gear train 36 include a second input 36'. The inputs 34', 36' are preferably gears rotatably mounted on a slidable shaft 38 such that the inputs 34' 36' are selectively engageable with the output 32. The input gears 34', 36' are preferably fixedly located along the length of the shaft 38 but are rotatable independently thereof.

Figure 2B:
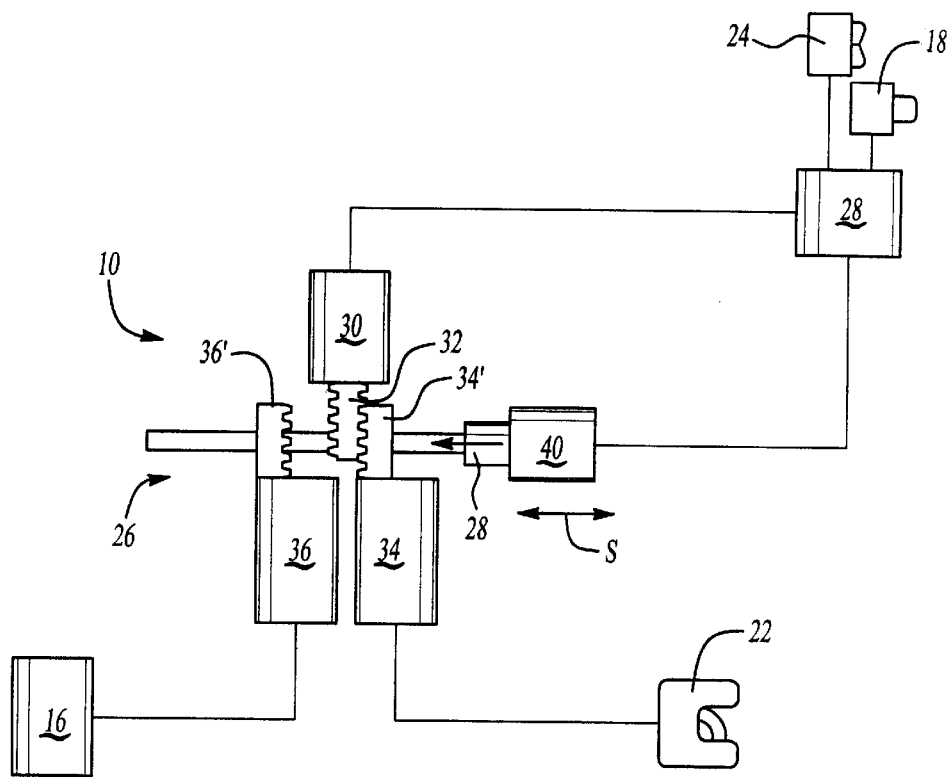
FIG. 2B is an schematic view of the drive system of FIG. 1 in a first position.
Figure 2C:
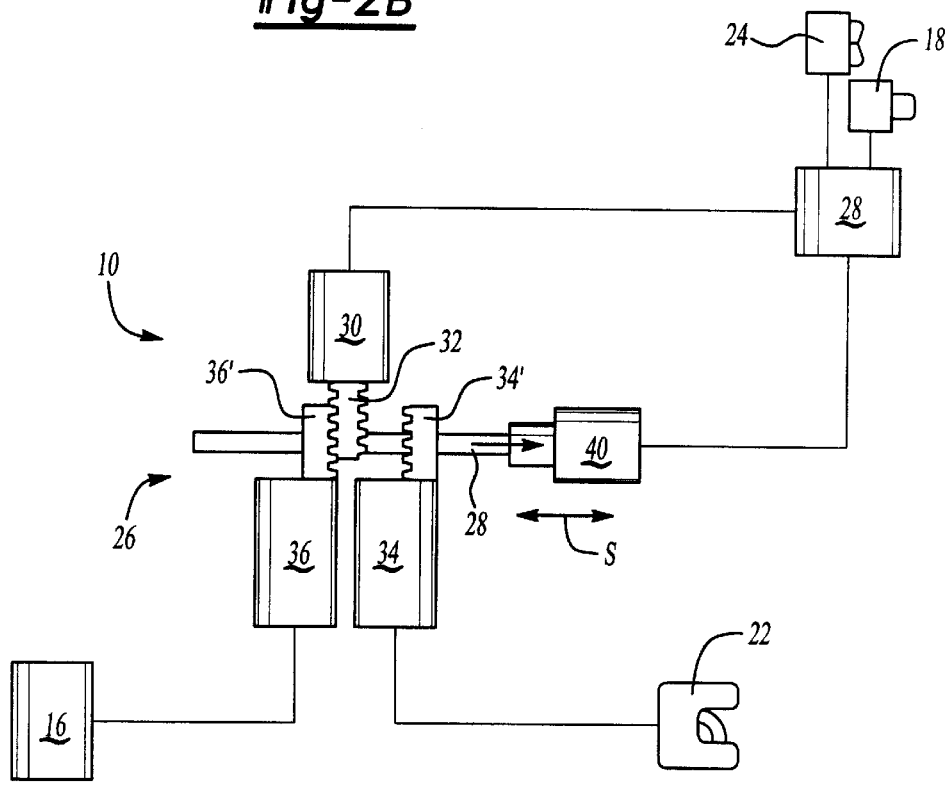
FIG. 2C is a schematic view of the drive system of FIG. 1 in a second position.

The shaft 38 and attached inputs 34', 36' are mounted to slide in the direction of double headed arrow S. An actuator 40 such as solenoid 40 selectively moves the shaft 38 between a first position in which input 34' is engaged with the output 32 (FIG. 2B) and a second position (FIG. 2C) in which input 36' is engaged with the output 32. When input gear 34' is engaged with the output 32 the drive motor 30 operates to lock and unlock the lock module drive assembly 22. When input 36' is engaged with the output 32 the drive motor 30 operates the window drive assembly 16 to drive the window 14 in the direction of arrow W (FIG. 1). Although the shaft 38 is movable relative to the motor 30 in the disclosed embodiment, it should be understood that the motor 30 may be movable relative to the shaft 40 in other embodiments.

In operation, a user desires to open the window 14 (FIG. 1) and actuates the second input 24. In response, the controller 28 activates the actuator 40 to move the shaft 28 from a neutral position (FIG. 2A) to the second position (FIG. 2C) in which input 36' is engaged with the output 32. The controller 28 then operates the drive motor 30 in the desired direction to drive the input 36' with the output 32. Accordingly, input 36' drives the second gear train 36 which drives the window drive assembly 16. The second input 24 may then be released by the user when the window 14 (FIG. 1) reaches the desired position. The controller 28 stops the drive motor 30 and again operates the actuator 40 to return the shaft 28 to the neutral position (FIG. 2A).

Importantly, by selectively connecting the drive motor to the desired device, duplication of the drive motor is eliminated. However, the drive motor 30 is connectable to only one of the gear trains 34 or 36, during any time period. It is therefore preferred that the controller 28 operates the actuator 40 in a manner that neither function will block out the other. For example only, should the lock be actuated during window closure both inputs 18 and 24 are being operated simultaneously. The controller 28 preferably momentarily stops operation of the window drive assembly 16 which requires a period of time to operate. The controller 28 then actuates the lock module drive assembly 22 which only requires a relatively short period of time to operate compared to operate the window drive assembly 28. In other words, the locking a lock requires a shorter period of motor 30 operation than that of opening or closing the window 14. In this way, a user closing the window and actuating the lock, will only notice a momentary pause in window closure during which the lock module drive assembly will be locked and then the window will continue closing.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drive system for a vehicle closure comprising:
   a drive motor having an output;
   a lock module drive assembly for driving a lock module of the vehicle closure;
   a window drive assembly for driving a window of the vehicle closure; and
   a selector assembly having a first input gear operatively connected to said lock module drive assembly and a second input gear operatively connected to said window drive assembly, said gears being disposed along a common axis, said selector assembly selectively movable between a first position in which said output engages said first input gear and said drive motor operates said lock module drive assembly, and a second position in which said output engages said second input gear and said drive motor operates said window drive assembly.

2. The system as recited in claim 1, wherein said lock module drive assembly includes a first gear train driven by said first input gear and said window drive assembly includes a second gear train driven by said second input gear, said output engageable with said first input gear in said first position to drive said lock module drive assembly, and said output engageable with said second input gear in said second position to drive said window drive assembly.

3. The system as recited in claim 1, wherein said selector assembly includes an actuator to selectively move said selector assembly between said first position and said second position.

4. The system as recited in claim 1, wherein said selector assembly includes a solenoid to selectively move said selector assembly between said first position and said second position.

5. The system as recited in claim 1, further comprising a control in communication with said selector assembly to selectively move said selector assembly between said first position and said second position.

6. The system as recited in claim 1, wherein said first gear and said second gear are mounted on a common shaft.

7. The system as recited in claim 6, wherein said common shaft is movable with said selector assembly between said first and second positions of said selector assembly.

8. The system as recited in claim 7, wherein said common shaft is slidable along said common axis.

9. A drive system for a vehicle closure comprising:
   a drive motor having an output;
   a lock module drive assembly for driving a lock module of the vehicle closure;
   a window drive assembly for driving a window of the vehicle closure;
   a selector assembly having a first input gear operatively connected to said lock module drive assembly and a second input gear operatively connected to said window drive assembly, said gears being disposed along a common slidable shaft, said shaft selectively movable between a first position and a second position; and
   a controller in communication with said selector assembly and said drive motor, said controller operable to slide said shaft to said first position in which said output is engaged with said first input gear such that said drive motor operates said lock module drive assembly, and said controller operable to slide said shaft to said second position in which said output is engaged with said second input gear such that said drive motor operates said window drive assembly.

10. The system as recited in claim 9, wherein said lock module drive assembly includes a first gear train including said first input gear and said window drive assembly includes a second gear train including said second input gear.

11. The system as recited in claim 10, wherein said selector assembly includes a solenoid to selectively move said slidable shaft between said first position and said second position.

12. A drive system for a vehicle closure comprising:
- a drive motor having an output;
- a lock module drive assembly operable by a first gear train;
- a window drive assembly operable by a second gear train;
- a selector assembly having a first input gear operatively connected to said second gear train and a second input gear operatively connected to said second gear train, said gears being disposed along a common slidable shaft, said shaft selectively movable between a first position and a second position; and
- a controller in communication with said selector assembly and said drive motor, said controller operable to slide said shaft to said first position in which said output is engaged with said first input gear such that said drive motor operates said lock module drive assembly for operating a lock module of the vehicle closure, and said controller operable to slide said shaft to said second position in which said output is engaged with said second input gear such that said drive motor operates said window drive assembly for operating a window of the vehicle closure.

* * * * *